(12) United States Patent
Dai et al.

(10) Patent No.: US 8,477,713 B2
(45) Date of Patent: Jul. 2, 2013

(54) SYSTEM AND A METHOD FOR INDICATING AN UPLINK RESOURCE

(75) Inventors: Bo Dai, Shenzhen (CN); Shuqiang Xia, Shenzhen (CN); Bin Yu, Shenzhen (CN); Chunli Liang, Shenzhen (CN); Peng Hao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 398 days.

(21) Appl. No.: 12/933,328

(22) PCT Filed: Mar. 16, 2009

(86) PCT No.: PCT/CN2009/070807
§ 371 (c)(1),
(2), (4) Date: Sep. 17, 2010

(87) PCT Pub. No.: WO2009/115027
PCT Pub. Date: Sep. 24, 2009

(65) Prior Publication Data
US 2011/0021227 A1      Jan. 27, 2011

(30) Foreign Application Priority Data

Mar. 18, 2008  (CN) .......................... 2008 1 0087314

(51) Int. Cl.
*H04W 4/00* (2009.01)
*H04B 7/00* (2006.01)

(52) U.S. Cl.
USPC .......................................... 370/330; 455/509

(58) Field of Classification Search
None
See application file for complete search history.

(56) References Cited

U.S. PATENT DOCUMENTS

| 6,501,745 B1 | 12/2002 | Turina et al. |
| 7,088,688 B2 | 8/2006 | Kim et al. |
| 2002/0150058 A1 | 10/2002 | Kim et al. |

(Continued)

FOREIGN PATENT DOCUMENTS

| CN | 101043458 | 9/2007 |
| CN | 101242668 | 8/2008 |
| WO | WO-2008024578 A2 | 2/2008 |

OTHER PUBLICATIONS

International Search Report issued in International Application No. PCT/CN2009/070807, completed Jun. 10, 2009, mailed Jun. 25, 2009 (3 pages).

(Continued)

*Primary Examiner* — Eunsook Choi
(74) *Attorney, Agent, or Firm* — Clark & Elbing LLP

(57) ABSTRACT

A method for indicating an uplink resource is provided, including that: when a base station side transmits an uplink resource indication signaling in a downlink subframe, an uplink subframe indication signaling corresponding to the uplink resource indication signaling being transmitted together; and the uplink subframe indication signaling is used for indicating an uplink subframe used by a user side to transmit data according to the uplink resource indication signaling. A system for implementing the method is also provided, which can distinguish a resource indication signaling corresponding to different uplink subframes in the same downlink subframe, and avoid that all the users of different uplink subframes transmit the data in the same resource of the same uplink frame, thereby avoiding mutual interference between the users of the uplink subframes, ensuring system performance and resulting in less signaling overhead.

20 Claims, 4 Drawing Sheets

When a base station side transmits an uplink resource indication signaling in a downlink subframe, an uplink subframe indication signaling corresponding to the uplink resource indication signaling is transmitted together; the uplink subframe indication signaling is used for indicating an uplink subframe used for transmitting the data according to the uplink resource indication signaling.

↓

After the user side has received the uplink resource indication signaling, it transmits the data at a corresponding location according to the indication of the uplink resource indication signaling in the uplink subframe indicated by the uplink subframe indication signaling corresponding to the uplink resource indication signaling.

U.S. PATENT DOCUMENTS

| | | | |
|---|---|---|---|
| 2008/0049690 A1* | 2/2008 | Kuchibhotla et al. | 370/338 |
| 2009/0129491 A1* | 5/2009 | Suo et al. | 375/260 |
| 2010/0027446 A1* | 2/2010 | Choi et al. | 370/280 |
| 2010/0322229 A1* | 12/2010 | Kim et al. | 370/345 |
| 2010/0325508 A1* | 12/2010 | Hu et al. | 714/749 |
| 2011/0007658 A1* | 1/2011 | Lindoff et al. | 370/252 |
| 2011/0007673 A1* | 1/2011 | Ahn et al. | 370/280 |
| 2011/0051666 A1* | 3/2011 | Kim et al. | 370/328 |
| 2012/0263079 A1* | 10/2012 | Struhsaker | 370/280 |

OTHER PUBLICATIONS

International Preliminary Report on Patentability issued in International Application No. PCT/CN2009/070807, issued Nov. 30, 2010 (5 pages).

Written Opinion of the International Searching Authority issued in International Application No. PCT/CN2009/070807, mailed Jun. 25, 2009 (4 pages).

* cited by examiner

When a base station side transmits an uplink resource indication signaling in a downlink subframe, an uplink subframe indication signaling corresponding to the uplink resource indication signaling is transmitted together; the uplink subframe indication signaling is used for indicating an uplink subframe used for transmitting the data according to the uplink resource indication signaling.

↓

After the user side has received the uplink resource indication signaling, it transmits the data at a corresponding location according to the indication of the uplink resource indication signaling in the uplink subframe indicated by the uplink subframe indication signaling corresponding to the uplink resource indication signaling.

Fig. 2

SYSTEM AND A METHOD FOR INDICATING AN UPLINK RESOURCE

CROSS-REFERENCE TO RELATED APPLICATIONS

This application is the U.S. national stage filing under 35 U.S.C. §371 of international application PCT/CN2009/070807, filed Mar. 16, 2009, which claims benefit of Chinese Patent Application CN 200810087314.4, filed Mar. 18, 2008.

FIELD OF THE INVENTION

The present invention relates to the field of mobile communication, and especially to a system and a method for indicating an uplink resource.

BACKGROUND OF THE INVENTION

An important feature of the TDD (Time Division Duplex) system is that the subframe for uplink and downlink transmission is configurable. The frame structure of the TDD system of the current LTE (Long Term Evolution) is shown in FIG. 1. A radio frame of 10 ms is divided into two half frames of 5 ms, and each half frame of 5 ms further comprises 8 normal time slots and 3 special time slots: a downlink time slot DwPTS, an uplink and downlink protection time slot GP, and an uplink time slot UpPTS. The sum of the durations of the three special time slots is 1 ms, and they constitute one subframe of 1 ms; each two continuous normal time slots constitute one subframe of 1 ms. In one radio frame of 10 ms, the former half frame of 5 ms comprises 4 subframes constituted by the normal time slots, being respectively subframe #0, subframe #2, subframe #3 and subframe #4, and one subframe constituted by the three special time slots; the latter half frame of 5 ms also comprises 4 subframes constituted by the normal time slots, being respectively subframe #5, subframe #6, subframe #7 and subframe #8, and one subframe constituted by the three special time slots (not shown in the Figure). Wherein, subframe #0, subframe #5 and the DwPTS are fixed as downlink time slots.

In the above frame structure, the proportion of the uplink and the downlink subframes (which refer to the subframes constituted by the normal time slots of uplink and downlink, excluding the subframes constituted by the special time slots) is related to a switching period. When the switching period is 5 ms, there are three options of the proportion of the uplink and downlink subframes: 3:1, 2:2 and 1:3. When the switching period is 10 ms, since subframe #5 and the DwPTS are fixed as the downlink subframes, there are also four options of the proportion of the uplink and downlink subframes: 3:6/2:7/1:8 and 5:3. Wherein, a further discussion is still to be conducted for the situation when the proportion of the uplink and downlink subframes is 3:5 in the period of 5 ms and the proportion of the uplink and downlink subframes is 10:0 in the period of 10 ms.

A resource indication signaling assigned to uplink data is transmitted via a downlink control channel, and this requires to establish a corresponding relationship between the uplink subframes and the downlink subframes, and then users can determine the uplink subframe on which the transmission should be performed after obtaining the resource indication signaling of the uplink data from the control channel of the downlink subframes.

Currently, it is regulated in the LTE systems that users transmit data at a corresponding location according to the indication of the uplink resource indication signaling in the $(n+4)^{th}$ uplink subframe after receiving the uplink resource indication signaling in the $n^{th}$ downlink subframe. In the FDD (Frequency Division Duplex) system, the uplink subframes and the downlink subframes are equal to each other in number, and a one-to-one corresponding relationship can be established between the uplink subframes and the downlink subframes according to this rule.

However, in the TDD system implementation process, there is at least the following problem in the prior art:

In the TDD system, when the number of the uplink subframes is larger than that of the downlink subframes, the uplink resource indication signals of multiple uplink subframes will be transmitted in one downlink subframe. If the original solution is followed, users of different uplink subframes will transmit data at the same resource of the same uplink subframe, which will result in mutual interference therebetween and affect system performance.

SUMMARY OF THE INVENTION

The present invention aims at solving a technical problem of providing a system and a method for indicating an uplink resource, which can distinguish different uplink resource indication signaling in the same uplink subframe, thereby avoiding mutual interference between the users of different uplink subframes, and improving the system performance.

To solve the above problem, the present invention provides a method for indicating an uplink resource, comprising:

when a base station side transmits an uplink resource indication signaling in a downlink subframe, an uplink subframe indication signaling corresponding to the uplink resource indication signaling being transmitted together; and the uplink subframe indication signaling is used for indicating an uplink subframe used by a user side to transmit data according to the uplink resource indication signaling.

Further, in the above method:

when a system only supports a single frame dispatching, the uplink subframe indication signaling is 1 bit and has two values of 0 and 1; wherein one value is used to denote that the data is transmitted according to the uplink resource indication signaling in the first uplink subframe after k subframes, and the other value is used to denote that the data is transmitted according to the uplink resource indication signaling in the second uplink subframe after k subframes; k is a fixed value and can be any value of 1 to 6.

Further, in the above method:

when the system supports not only a single frame dispatching but also a multi-frame dispatching, the uplink subframe indication signaling is 2 bits and has four values of 00, 01, 10 and 11; and the four values respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data according to the uplink resource indication signaling in the first and the second uplink subframes after k subframes;

four, transmitting the data according to the uplink resource indication signaling in the first, the second and the third uplink subframes after k subframes; and k is a fixed value and can be any value of 1 to 6.

Further, in the above method:

when the system supports not only a single frame dispatching but also a multi-frame dispatching, the uplink subframe indication signaling is 2 bits and has four values of 00, 01, 10 and 11; and the four values respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data according to the uplink resource indication signaling in the first and the second uplink subframes after k subframes;

four, transmitting the data according to the uplink resource indication signaling in the second and the third uplink subframes after k subframes; and k is a fixed value and can be any value of 1 to 6.

Further, in the above method:

when the system supports not only a single frame dispatching but also a multi-frame dispatching, the uplink subframe indication signaling is 2 bits and has four values of 00, 01, 10 and 11; and the four values respectively uniquely represent one of the following four different meanings:

one, transmitting the data according to the uplink resource indication signaling in the first uplink subframe after k subframes;

two, transmitting the data and a channel quality indication signaling according to the uplink resource indication signaling in the first uplink subframe after k subframes;

three, transmitting the data according to the uplink resource indication signaling in the second uplink subframe after k subframes;

four, transmitting the data according to the uplink resource indication signaling in the second and the third uplink subframes after k subframes; and k is a fixed value and can be any value of 1 to 6.

Further, in the above method:

when the system supports not only a single frame dispatching but also a multi-frame dispatching, the uplink subframe indication signaling is 2 bits and has four values of 00, 01, 10 and 11; when a switching period is 5 ms and the proportion of the uplink subframes and the downlink subframes is 3:1, for the uplink subframe indication signaling in subframe #0 and subframe #5, the four values respectively uniquely represent one of the following four different meanings:

one, transmitting the data according to the uplink resource indication signaling in the first uplink subframe after k subframes;

two, transmitting the data according to the uplink resource indication signaling in the first uplink subframe after k subframes, and transmitting a channel quality indication signaling;

three, transmitting the data and a channel quality indication signaling according to the uplink resource indication signaling in the second uplink subframe after k subframes;

four, transmitting the data according to the uplink resource indication signaling in the first and the second uplink subframes after k subframes; and for the uplink subframe indication signaling in a DwPTS, the four values respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data and a channel quality indication signaling according to the uplink resource indication signaling in the second uplink subframe after k subframes;

four, transmitting the data according to the uplink resource indication signaling in the first and the second uplink subframes after k subframes; and k is a fixed value and can be any value of 1 to 6.

Further, in the above method:

when the system supports not only a single frame dispatching but also a multi-frame dispatching, the uplink subframe indication signaling is 2 bits and has four values of 00, 01, 10 and 11; when a switching period is 5 ms and the proportion of the uplink subframes and the downlink subframes is 3:1, for the uplink subframe indication signaling in subframe #0 and subframe #5, the four values respectively uniquely represent one of the following four different meanings:

one, transmitting the data according to the uplink resource indication signaling in the first uplink subframe after k subframes;

two, transmitting the data and a channel quality indication signaling according to the uplink resource indication signaling in the first uplink subframe after k subframes;

three, transmitting the data according to the uplink resource indication signaling in the second uplink subframe after k subframes;

four, transmitting the data according to the uplink resource indication signaling in the second and the third uplink subframes after k subframes; and for the uplink subframe indication signaling in a DwPTS, the four values respectively uniquely represent one of the following four different meanings:

one, transmitting the data and a channel quality indication signaling according to the uplink resource indication signaling in the second uplink subframe after k subframes;

two, transmitting the data and a channel quality indication signaling according to the uplink resource indication signaling in the first uplink subframe after k subframes;

three, transmitting the data according to the uplink resource indication signaling in the second uplink subframe after k subframes;

four, transmitting the data according to the uplink resource indication signaling in the second and the third uplink subframes after k subframes; and k is a fixed value and can be any value of 1 to 6.

Further, in the above method:

when the system supports not only a single frame dispatching but also a multi-frame dispatching, the uplink subframe indication signaling is 2 bits and has four values of 00, 01, 10 and 11; when a switching period is 5 ms and the proportion of the uplink subframe and the downlink subframes is 3:1, for the uplink subframe indication signaling in subframe #0 and subframe #5, the four values respectively uniquely represent one of the following four different meanings:

one, transmitting the data according to the uplink resource indication signaling in the first uplink subframe after k subframes;

two, transmitting the data and a channel quality indication signaling according to the uplink resource indication signaling in the first uplink subframe after k subframes;

three, transmitting the data and a channel quality indication signaling according to the uplink resource indication signaling in the second uplink subframe after k subframes;

four, transmitting the data according to the uplink resource indication signaling in the second and the third uplink subframes after k subframes; and for the uplink subframe indication signaling in a DwPTS, the four values respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data and a channel quality indication signaling according to the uplink resource indication signaling in the second uplink subframe after k subframes;

four, transmitting the data according to the uplink resource indication signaling in the second and the third uplink subframes after k subframes; and k is a fixed value and can be any value of 1 to 6.

Further, in the above method:

the value of k is 2 or 3.

Further, in the above method:

after receiving the uplink resource indication signaling, the user side transmits data at a corresponding location according to the indication of the uplink resource indication signaling in the uplink subframe indicated by the uplink subframe indication signaling corresponding to the uplink resource indication signaling.

To realize the above method, the present invention also provides a system for indicating the uplink resource, comprising a base station and a terminal, and the base station comprises an uplink resource indication signaling generating unit, an uplink subframe indication signaling generating unit and a transmitting unit, wherein:

the uplink resource indication signaling generating unit is adapted to generate an uplink resource indication signaling and transmit it to the transmitting unit;

the uplink subframe indication signaling generating unit is adapted to acquire the uplink resource indication signaling from the uplink resource indication signaling generating unit, generate an uplink subframe indication signaling corresponding to the acquired uplink resource indication signaling, and transmit it to the transmitting unit; the uplink subframe indication signaling is used to indicate the terminal to transmit data in a corresponding uplink subframe according to the uplink resource indication signaling; and the transmitting unit is adapted to transmit the uplink resource indication signaling and the uplink subframe indication signaling corresponding thereto in a downlink subframe.

Further, in the above system:

When the system only supports a single frame dispatching, the uplink subframe indication signaling generating unit generates an uplink subframe indication signaling of 1 bit which has two values of 0 and 1; wherein one value is used to denote that the data is transmitted according to the uplink resource indication signaling in the first uplink subframe after k subframes, and the other value is used to denote that the data is transmitted according to the uplink resource indication signaling in the second uplink subframe after k subframes; and k is a fixed value and can be any value of 1 to 6.

Further, in the above system:

when the system supports not only a single frame dispatching but also a multi-frame dispatching, the uplink subframe indication signaling generating unit generates an uplink subframe indication signaling of 2 bits which has four values of 00, 01, 10 and 11; and the four values respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data according to the uplink resource indication signaling in the first and the second uplink subframes after k subframes;

four, transmitting the data according to the uplink resource indication signaling in the first, the second and the third uplink subframes after k subframes; and k is a fixed value and can be any value of 1 to 6.

Further, in the above system:

when the system supports not only a single frame dispatching but also a multi-frame dispatching, the uplink subframe indication signaling generating unit generates an uplink subframe indication signaling of 2 bits which has four values of 00, 01, 10 and 11; and the four values respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data according to the uplink resource indication signaling in the first and the second uplink subframes after k subframes;

four, transmitting the data according to the uplink resource indication signaling in the second and the third uplink subframes after k subframes; and k is a fixed value and can be any value of 1 to 6.

Further, in the above system:

when the system supports not only a single frame dispatching but also a multi-frame dispatching, the uplink subframe indication signaling generating unit generates an uplink subframe indication signaling of 2 bits which has four values of 00, 01, 10 and 11; and the four values respectively uniquely represent one of the following four different meanings:

one, transmitting the data according to the uplink resource indication signaling in the first uplink subframe after k subframes;

two, transmitting the data and a channel quality indication signaling according to the uplink resource indication signaling in the first uplink subframe after k subframes;

three, transmitting the data according to the uplink resource indication signaling in the second uplink subframe after k subframes;

four, transmitting the data according to the uplink resource indication signaling in the second and the third uplink subframes after k subframes; and k is a fixed value and can be any value of 1 to 6.

Further, in the above system:

when the system supports not only a single frame dispatching but also a multi-frame dispatching, the uplink subframe indication signaling generating unit generates an uplink subframe indication signaling of 2 bits which has four values of 00, 01, 10 and 11; when a switching period is 5 ms and the proportion of the uplink subframes and the downlink subframes is 3:1, for the uplink subframe indication signaling in subframe #0 and subframe #5, the four values respectively uniquely represent one of the following four different meanings:

one, transmitting the data according to the uplink resource indication signaling in the first uplink subframe after k subframes;

two, transmitting the data according to the uplink resource indication signaling in the first uplink subframe after k subframes, and transmitting a channel quality indication signaling;

three, transmitting the data and a channel quality indication signaling according to the uplink resource indication signaling in the second uplink subframe after k subframes;

four, transmitting the data according to the uplink resource indication signaling in the first and the second uplink subframes after k subframes; and for the uplink subframe indication signaling in a DwPTS, the four values respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data and a channel quality indication signaling according to the uplink resource indication signaling in the second uplink subframe after k subframes;

four, transmitting the data according to the uplink resource indication signaling in the first and the second uplink subframes after k subframes; and k is a fixed value and can be any value of 1 to 6.

Further, in the above system:

when the system supports not only a single frame dispatching but also a multi-frame dispatching, the uplink subframe indication signaling generating unit generates an uplink subframe indication signaling of 2 bits which has four values of 00, 01, 10 and 11; when a switching period is 5 ms and the proportion of the uplink subframes and the downlink subframes is 3:1, for the uplink subframe indication signaling in subframe #0 and subframe #5, the four values respectively uniquely represent one of the following four different meanings:

one, transmitting the data according to the uplink resource indication signaling in the first uplink subframe after k subframes;

two, transmitting the data and a channel quality indication signaling according to the uplink resource indication signaling in the first uplink subframe after k subframes;

three, transmitting the data according to the uplink resource indication signaling in the second uplink subframe after k subframes;

four, transmitting the data according to the uplink resource indication signaling in the second and the third uplink subframes after k subframes; and for the uplink subframe indication signaling in a DwPTS, the four values respectively uniquely represent one of the following four different meanings:

one, transmitting the data and a channel quality indication signaling according to the uplink resource indication signaling in the second uplink subframe after k subframes;

two, transmitting the data and a channel quality indication signaling according to the uplink resource indication signaling in the first uplink subframe after k subframes;

three, transmitting the data according to the uplink resource indication signaling in the second uplink subframe after k subframes;

four, transmitting the data according to the uplink resource indication signaling in the second and the third uplink subframes after k subframes; and k is a fixed value and can be any value of 1 to 6.

Further, in the above system:

when the system supports not only a single frame dispatching but also a multi-frame dispatching, the uplink subframe indication signaling generating unit generates an uplink subframe indication signaling of 2 bits which has four values of 00, 01, 10 and 11; when a switching period is 5 ms and the proportion of the uplink subframes and the downlink subframes is 3:1, for the uplink subframe indication signaling in subframe #0 and subframe #5, the four values respectively uniquely represent one of the following four different meanings:

one, transmitting the data according to the uplink resource indication signaling in the first uplink subframe after k subframes;

two, transmitting the data and a channel quality indication signaling according to the uplink resource indication signaling in the first uplink subframe after k subframes;

three, transmitting the data and a channel quality indication signaling according to the uplink resource indication signaling in the second uplink subframe after k subframes;

four, transmitting the data according to the uplink resource indication signaling in the second and the third uplink subframes after k subframes; and for the uplink subframe indication signaling in a DwPTS, the four values respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data and a channel quality indication signaling according to the uplink resource indication signaling in the second uplink subframe after k subframes;

four, transmitting the data according to the uplink resource indication signaling in the second and the third uplink subframes after k subframes; and k is a fixed value and can be any value of 1 to 6.

Further, in the above system:

the value of k is 2 or 3.

Further, in the above system:

after receiving the uplink resource indication signaling and the uplink subframe indication signaling corresponding thereto, the terminal transmits the data at a corresponding location according to the indication of the uplink resource indication signaling in the uplink subframe indicated by the uplink subframe indication signaling.

The system and the method for indicating an uplink resource provided by the present invention can distinguish a resource indication signaling corresponding to different uplink subframes in the same downlink subframe, and avoid that all the users of different uplink subframes transmit the data in the same resource of the same uplink frame, thereby avoiding mutual interference between the users of the uplink subframes, ensuring system performance and resulting in less signaling overhead.

BRIEF DESCRIPTION OF THE DRAWINGS

FIG. 2 is a flow chart of the specific implementation of indicating an uplink resource provided by an embodiment of the present invention;

DETAILED DESCRIPTION OF THE EMBODIMENTS

Figure 1:
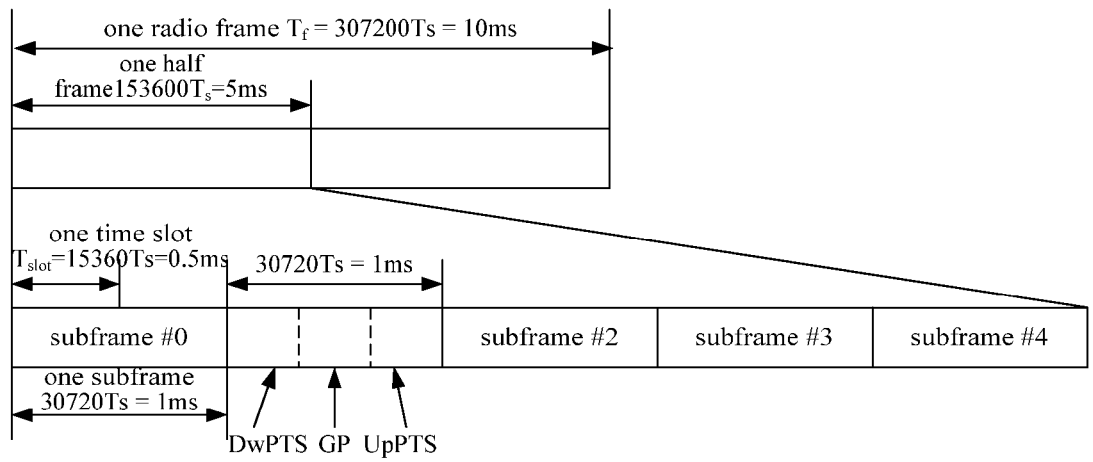
FIG. 1 is a schematic view of the frame structure of a TDD system in the prior art.

The technical solution of the present invention will be further described in detail hereinafter in conjunction with the drawings and the embodiments.

An embodiment of the present invention provides a method for indicating the uplink resource, comprising:

when a base station side transmits an uplink resource indication signaling in a downlink subframe, an uplink subframe indication signaling corresponding to the uplink resource indication signaling is transmitted together; and the uplink subframe indication signaling is used for indicating an uplink subframe corresponding to the uplink resource indication signaling, i.e., for indicating the uplink subframe used to transmit the data according to the uplink resource indication signaling.

The method according to the embodiment may further comprise: after receiving the uplink resource indication signaling, the user side transmits data at a corresponding location according to the indication of the uplink resource indication signaling in the uplink subframe indicated by the uplink subframe indication signaling corresponding to the uplink resource indication signaling.

The method according to the embodiment may further comprise: when the system only supports a single frame dispatching, the uplink subframe indication signaling is 1 bit and has two values of 0 and 1; wherein one value is used to denote that the data is transmitted according to the uplink resource indication signaling in the first uplink subframe after k subframes, and the other value is used to denote that the data is transmitted according to the uplink resource indication signaling in the second uplink subframe after k subframes. The single frame dispatching refers to that each uplink resource indication signaling represents the resource location of the data transmitted by one user in one uplink subframe.

k is a fixed value and can be any value of 1 to 6, and in this embodiment, the value of k is 2 or 3, and the fixed value means that the value of k in the system is predetermined.

Herein it needs to be indicated that although the two values above only respectively represent that the data is transmitted in the first/second uplink subframe after k subframes, when different values are assigned to k, the situations represented by the two values can cover the options of various combinations of two uplink subframes, and thus, the meanings such as "transmitting the data in the third uplink subframe after k subframes" are all contained in the scope of protection of the present invention.

The method of this embodiment may further comprise: when the system supports not only the single frame dispatching but also a multi-frame dispatching, the uplink subframe indication signaling is 2 bits and has four values of 00, 01, 10 and 11. The meanings represented by the four values respectively can be selected specifically according to the situations of the system, and this embodiment only describes six possible general situations, while practical implementations are not limited to the six situations.

The first situation, in which the four values respectively uniquely represent one of the following four different meanings, that is, the four values are in one-to-one correspondence with the following four circumstances, and which value refers to which meaning is optional:

one, transmitting the data according to the uplink resource indication signaling in the first uplink subframe after k subframes;

two, transmitting the data according to the uplink resource indication signaling in the second uplink subframe after k subframes;

three, transmitting the data according to the uplink resource indication signaling in the first and the second uplink subframes after k subframes; and four, transmitting the data according to the uplink resource indication signaling in the first, the second and the third uplink subframes after k subframes.

The second situation, in which the four values respectively uniquely represent one of the following four different meanings, that is, the four values are in one-to-one correspondence with the following four circumstances, and which value refers to which meaning is optional:

one, transmitting the data according to the uplink resource indication signaling in the first uplink subframe after k subframes;

two, transmitting the data according to the uplink resource indication signaling in the second uplink subframe after k subframes;

three, transmitting the data according to the uplink resource indication signaling in the first and the second uplink subframes after k subframes; and four, transmitting the data according to the uplink resource indication signaling in the second and the third uplink subframes after k subframes.

The third situation, in which the four values respectively uniquely represent one of the following four different meanings, that is, the four values are in one-to-one correspondence with the following four circumstances, and which value refers to which meaning is optional:

one, transmitting the data according to the uplink resource indication signaling in the first uplink subframe after k subframes;

two, transmitting the data and a CQI (Channel Quality Indication) signaling according to the uplink resource indication signaling in the first uplink subframe after k subframes;

three, transmitting the data according to the uplink resource indication signaling in the second uplink subframe after k subframes; and four, transmitting the data according to the uplink resource indication signaling in the second and the third uplink subframes after k subframes.

The fourth situation is applied when the switching period is 5 ms and the proportion of the uplink subframes and the downlink subframes is 3:1;

for the uplink subframe indication signaling in subframe #0 and subframe #5, the four values respectively uniquely represent one of the following four different meanings, that is, the four values are in one-to-one correspondence with the following four circumstances, and which value refers to which meaning is optional:

one, transmitting the data according to the uplink resource indication signaling in the first uplink subframe after k subframes;

two, transmitting the data and the CQI signaling according to the uplink resource indication signaling in the first uplink subframe after k subframes;

three, transmitting the data and according to the uplink resource indication signaling in the second uplink subframe after k subframes, and transmitting the CQI signaling;

four, transmitting the data according to the uplink resource indication signaling in the first and the second uplink subframes after k subframes; and for the uplink subframe indication signaling in a DwPTS, the four values respectively uniquely represent one of the following four different meanings, that is, the four values are in one-to-one correspondence with the following four circumstances, and which value refers to which meaning is optional:

one, transmitting the data according to the uplink resource indication signaling in the first uplink subframe after k subframes;

two, transmitting the data according to the uplink resource indication signaling in the second uplink subframe after k subframes;

three, transmitting the data and the CQI signaling according to the uplink resource indication signaling in the second uplink subframe after k subframes; and four, transmitting the data according to the uplink resource indication signaling in the first and the second uplink subframes after k subframes.

The fifth situation is also applied when the switching period is 5 ms and the proportion of the uplink subframes and the downlink subframes is 3:1;

for the uplink subframe indication signaling in subframe #0 and subframe #5, the four values respectively uniquely represent one of the following four different meanings, that is, the four values are in one-to-one correspondence with the following four circumstances, and which value refers to which meaning is optional:

one, transmitting the data according to the uplink resource indication signaling in the first uplink subframe after k subframes;

two, transmitting the data and the CQI signaling according to the uplink resource indication signaling in the first uplink subframe after k subframes;

three, transmitting the data according to the uplink resource indication signaling in the second uplink subframe after k subframes;

four, transmitting the data according to the uplink resource indication signaling in the second and the third uplink subframes after k subframes; and for the uplink subframe indication signaling in the DwPTS, the four values respectively uniquely represent one of the following four different meanings, that is, the four values are in one-to-one correspondence with the following four circumstances, and which value refers to which meaning is optional:

one, transmitting the data and the CQI signaling according to the uplink resource indication signaling in the second uplink subframe after k subframes;

two, transmitting the data and the CQI signaling according to the uplink resource indication signaling in the first uplink subframe after k subframes;

three, transmitting the data according to the uplink resource indication signaling in the second uplink subframe after k subframes;

four, transmitting the data according to the uplink resource indication signaling in the second and the third uplink subframes after k subframes.

The sixth situation is also applied when the switching period is 5 ms and the proportion of the uplink subframes and the downlink subframes is 3:1;

for the uplink subframe indication signaling in subframe #0 and subframe #5, the four values respectively uniquely represent one of the following four different meanings, that is, the four values are in one-to-one correspondence with the following four circumstances, and which value refers to which meaning is optional:

one, transmitting the data according to the uplink resource indication signaling in the first uplink subframe after k subframes;

two, transmitting the data and the CQI signaling according to the uplink resource indication signaling in the first uplink subframe after k subframes;

three, transmitting the data and the CQI signaling according to the uplink resource indication signaling in the second uplink subframe after k subframes;

four, transmitting the data according to the uplink resource indication signaling in the second and the third uplink subframes after k subframes; and for the uplink subframe indication signaling in the DwPTS, the four values respectively uniquely represent one of the following four different meanings, that is, the four values are in one-to-one correspondence with the following four circumstances, and which value refers to which meaning is optional:

one, transmitting the data according to the uplink resource indication signaling in the first uplink subframe after k subframes;

two, transmitting the data according to the uplink resource indication signaling in the second uplink subframe after k subframes;

three, transmitting the data and the CQI indication signaling according to the uplink resource indication signaling in the second uplink subframe after k subframes; and four, transmitting the data according to the uplink resource indication signaling in the second and the third uplink subframes after k subframes.

For the above six situations, which value specifically refers to which meaning is optional; k is a fixed value and can be any value of 1 to 6, and in this embodiment the value of k is 2 or 3, and the fixed value means that the value of k in the system is predetermined.

Herein it needs to be indicated that although the above meanings do not clearly include the meaning of "transmitting the data in the first and the third uplink subframes after k subframes", this meaning is indeed included in the meaning of "transmitting the data in the first and the second uplink subframe after k subframes", since when different values are assigned to k, the situations represented by this meaning can cover the options of various combinations of two uplink subframes, and thus the meaning of "transmitting the data in the first and the third uplink subframes after k subframes" is also contained in the scope of protection of the present invention.

Further description will be made hereinafter with three implementation embodiments of the present invention.

In the three implementation embodiments, the switching period of the TDD system is 5 ms, the proportion of the uplink subframes, UL, and the downlink subframes, DL, is 3:1, the subframe #0 is the downlink subframe, as the uplink resource indication signaling can also be transmitted in the DwPTS, the proportion of the uplink subframes and the downlink subframes can be deemed as 3:2.

The first implementation embodiment: the system performs the single frame dispatching, k=3, and it is supposed that the user side receives the uplink resource indication signaling in the $n^{th}$ subframe, the $n^{th}$ subframe is the downlink subframe.

Figure 3:
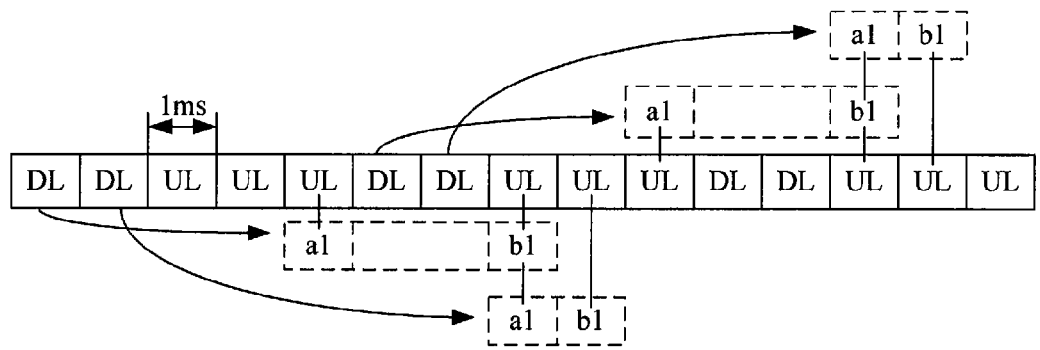
FIG. 3 is a schematic view 1 of the corresponding relationship between the uplink subframes and the downlink subframes in an implementation embodiment of the present invention.

When the base station side transmits the uplink resource indication signaling in the downlink subframe, the uplink subframe indication signaling corresponding to the uplink resource indication signaling is transmitted together; the uplink subframe indication signaling is 1 bit, wherein 0 represents transmitting the data in the first uplink subframe after the $(n+3)^{th}$ subframe, as shown in FIG. 3, i.e., transmitting the data in the uplink subframe a1 in FIG. 3; 1 represents transmitting the data in the second uplink subframe after the $(n+3)^{th}$ subframe, i.e., transmitting the data in the uplink subframe b1 in FIG. 3.

The second implementation embodiment: the system performs the single frame dispatching, k=3, and it is supposed that the user side receives the uplink resource indication signaling in the $n^{th}$ subframe, the $n^{th}$ subframe is the downlink subframe.

Figure 4:
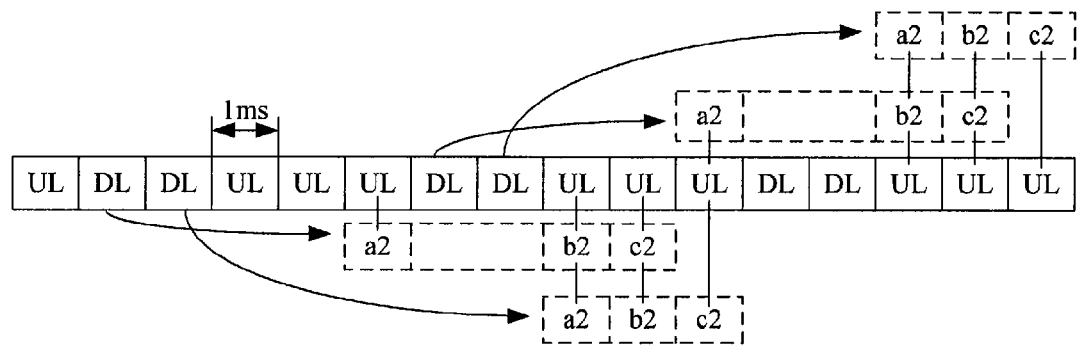
FIG. 4 is a schematic view 2 of the corresponding relationship between the uplink subframes and the downlink subframes in an implementation embodiment of the present invention.

When the base station side transmits the uplink resource indication signaling in the downlink subframe, the uplink subframe indication signaling corresponding to the uplink resource indication signaling is transmitted together; the uplink subframe indication signaling is 2 bits, wherein 00 represents transmitting the data in the first uplink subframe after the $(n+3)^{th}$ subframe, as shown in FIG. 4, i.e., transmitting the data in the uplink subframe a2 in FIG. 4; 01 represents transmitting the data in the second uplink subframe after the $(n+3)^{th}$ subframe, i.e., transmitting the data in the uplink subframe b2 in FIG. 4; 10 represents transmitting the data in the first and the second uplink subframes after the $(n+3)^{th}$ subframe, i.e., transmitting the data in the uplink subframes a2 and b2 in FIG. 4; and 11 represents transmitting the data in the first, the second and the third uplink subframes after the $(n+3)^{th}$ subframe, i.e., transmitting the data in the uplink subframes a2, b2 and c2 in FIG. 4.

The third implementation embodiment: the system performs the single frame dispatching, k=3, and it is supposed the user side receives the uplink resource indication signaling in the $n^{th}$ subframe, the $n^{th}$ subframe is the downlink subframe.

When the base station side transmits the uplink resource indication signaling in the downlink subframe, the uplink subframe indication signaling corresponding to the uplink resource indication signaling is transmitted together; the uplink subframe indication signaling is 2 bits, wherein 00 represents transmitting the data in the first uplink subframe after the $(n+3)^{th}$ subframe, as shown in FIG. 4, i.e., transmitting the data in the uplink subframe a2 in FIG. 4; 01 represents transmitting the data in the second uplink subframe after the $(n+3)^{th}$ subframe, i.e., transmitting the data in the uplink subframe b2 in FIG. 4; 10 represents transmitting the data in the first and the second uplink subframes after the $(n+3)^{th}$ subframe, i.e., transmitting the data in the uplink subframes a2 and b2 in FIG. 4; and 11 represents transmitting the data in the second and the third uplink subframes after the $(n+3)^{th}$ subframe, i.e., transmitting the data in the uplink subframes b2 and c2 in FIG. 4.

Figure 5:
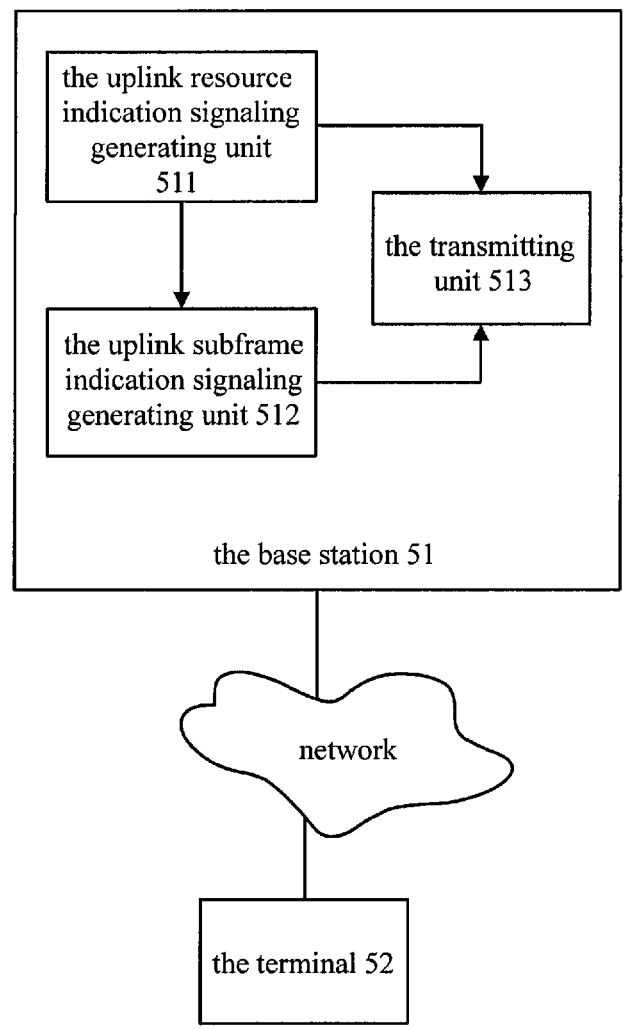
FIG. 5 is a block diagram of the system for indicating an uplink resource provided by an embodiment of the present invention.

To realize the above methods for indicating the uplink resource provided by the embodiments of the present invention, a system for indicating the uplink resource is also provided, as shown in FIG. 5, comprising the base station 51 and the terminal 52, and the base station 51 comprises an uplink resource indication signaling generating unit 511, an uplink subframe indication signaling generating unit 512 and a transmitting unit 513, wherein, the uplink resource indication signaling generating unit 511 generates the uplink resource indication signaling and transmits it to the transmitting unit 513;

the uplink subframe indication signaling generating unit 512 acquires the uplink resource indication signaling from the uplink resource indication signaling generating unit 511, generates an uplink subframe indication signaling corresponding to the acquired uplink resource indication signaling, and transmits it to the transmitting unit 513; the uplink subframe indication signaling is used to indicate the terminal 52 to transmit the data in a corresponding uplink subframe according to the uplink resource indication signaling; and the transmitting unit 513 transmits the uplink resource indication signaling and the uplink subframe indication signaling corresponding thereto in the downlink subframe.

When the system only supports the single frame dispatching, the uplink subframe indication signaling generating unit 512 generates the uplink subframe indication signaling of 1 bit which has two values of 0 and 1; when the system supports not only the single frame dispatching but also the multi-frame dispatching, the uplink subframe indication signaling generating unit 512 generates the uplink subframe indication signaling of 2 bits which has four values of 00, 01, 10 and 11. The meanings represented by the values respectively are the same as those described above and thus are omitted here.

After the terminal 52 has received the uplink resource indication signaling and the uplink subframe indication signaling corresponding thereto, it transmits the data at a corresponding location according to the indication of the uplink resource indication signaling in the uplink subframe indicated by the uplink subframe indication signaling.

Of course, the present invention can have many other embodiments, and those skilled in the art may make various corresponding changes and variations to the present invention without departing from the spirit and the substantive situations of the present invention, and such corresponding changes and variations shall all be contained within the scope of protection of the claims of the present invention.

INDUSTRIAL APPLICABILITY

The system and the method for indicating the uplink resource provided by the present invention can distinguish the resource indication signaling corresponding to different uplink subframes in the same downlink subframe, and avoid that all the users of different uplink subframes transmit the data in the same resource of the same uplink frame, thereby avoiding mutual interference between the users of the uplink subframes, ensuring the system performance and resulting in less signaling overhead.

The invention claimed is:

1. A method for indicating an uplink resource, comprising:
when transmitting an uplink resource indication signaling in a downlink subframe, a base station side transmitting an uplink subframe indication signaling corresponding to the uplink resource indication signaling together with the uplink resource indication signaling; and the uplink subframe indication signaling is used for indicating an uplink subframe used by a user side to transmit data according to the uplink resource indication signaling; wherein,
when a system only supports a single frame dispatching, the uplink subframe indication signaling is 1 bit and has two values of 0 and 1; wherein one value is used to denote that the data is transmitted according to the uplink resource indication signaling in the first uplink subframe after k subframes, and the other value is used to denote that the data is transmitted according to the uplink resource indication signaling in the second uplink subframe after k subframes; and k is a fixed value and can be any value of 1 to 6; or when the system supports not only a single frame dispatching but also a multi-frame dispatching, the uplink subframe indication signaling is 2 bits and has four values of 00, 01, 10 and 11; and the four values respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data according to the uplink resource indication signaling in the first and the second uplink subframes after k subframes;

four, transmitting the data according to the uplink resource indication signaling in the first, the second and the third uplink subframes after k subframes;

k is a fixed value and can be any value of 1 to 6; or when the system supports not only a single frame dispatching but also a multi-frame dispatching, the uplink subframe indication signaling is 2 bits and has four values of 00, 01, 10 and 11; and the four values respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data according to the uplink resource indication signaling in the first and the second uplink subframes after k subframes;

four, transmitting the data according to the uplink resource indication signaling in the second and the third uplink subframes after k subframes;

k is a fixed value and can be any value of 1 to 6; or when the system supports not only a single frame dispatching but also a multi-frame dispatching, the uplink subframe indication signaling is 2 bits and has four values of 00, 01, 10 and 11; and the four values respectively uniquely represent one of the following four different meanings:

one, transmitting the data according to the uplink resource indication signaling in the first uplink subframe after k subframes;

two, transmitting the data and a channel quality indication signaling according to the uplink resource indication signaling in the first uplink subframe after k subframes;

three, transmitting the data according to the uplink resource indication signaling in the second uplink subframe after k subframes;

four, transmitting the data according to the uplink resource indication signaling in the second and the third uplink subframes after k subframes;

k is a fixed value and can be any value of 1 to 6; or when the system supports not only single frame dispatching but also multi-frame dispatching, the uplink subframe indication signaling is 2 bits and has four values of 00, 01, 10 and 11; when a switching period is 5 ms and the proportion of the uplink subframes and the downlink subframes is 3:1, for the uplink subframe indication signaling in subframe #0 and subframe #5, the four values respectively uniquely represent one of the following four different meanings:

one, transmitting the data according to the uplink resource indication signaling in the first uplink subframe after k subframes;

two, transmitting the data according to the uplink resource indication signaling in the first uplink subframe after k subframes, and transmitting a channel quality indication signaling;

three, transmitting the data and a channel quality indication signaling according to the uplink resource indication signaling in the second uplink subframe after k subframes;

four, transmitting the data according to the uplink resource indication signaling in the first and the second uplink subframes after k subframes;

for the uplink subframe indication signaling in a Downlink Pilot Time Slot (DwPTS), the four values of 00, 01, 10, and 11 respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data and a channel quality indication signaling according to the uplink resource indication signaling in the second uplink subframe after k subframes;

four, transmitting the data according to the uplink resource indication signaling in the first and the second uplink subframes after k subframes;

k is a fixed value and can be any value of 1 to 6; or when the system supports not only a single frame dispatching but also a multi-frame dispatching, the uplink subframe indication signaling is 2 bits and has four values of 00, 01, 10 and 11; when a switching period is 5 ms and the proportion of the uplink subframes and the downlink subframes is 3:1, for the uplink subframe indication signaling in subframe #0 and subframe #5, the four values respectively uniquely represent one of the following four different meanings:

one, transmitting the data according to the uplink resource indication signaling in the first uplink subframe after k subframes;

two, transmitting the data and a channel quality indication signaling according to the uplink resource indication signaling in the first uplink subframe after k subframes;

three, transmitting the data according to the uplink resource indication signaling in the second uplink subframe after k subframes;

four, transmitting the data according to the uplink resource indication signaling in the second and the third uplink subframes after k subframes;

for the uplink subframe indication signaling in a DwPTS, the four values of 00, 01, 10, and 11 respectively uniquely represent one of the following four different meanings:

one, transmitting the data and a channel quality indication signaling according to the uplink resource indication signaling in the second uplink subframe after k subframes;

two, transmitting the data and the channel quality indication signaling according to the uplink resource indication signaling in the first uplink subframe after k subframes;

three, transmitting the data according to the uplink resource indication signaling in the second uplink subframe after k subframes;

four, transmitting the data according to the uplink resource indication signaling in the second and the third uplink subframes after k subframes;

k is a fixed value and can be any value of 1 to 6; or when the system supports not only a single frame dispatching but also a multi-frame dispatching, the uplink subframe indication signaling is 2 bits and has four values of 00, 01, 10 and 11; when a switching period is 5 ms and the proportion of the uplink subframe and the downlink subframes is 3:1, for the uplink subframe indication signaling in subframe #0 and subframe #5, the four values respectively uniquely represent one of the following four different meanings:

one, transmitting the data according to the uplink resource indication signaling in the first uplink subframe after k subframes;

two, transmitting the data and a channel quality indication signaling according to the uplink resource indication signaling in the first uplink subframe after k subframes;

three, transmitting the data and the channel quality indication signaling according to the uplink resource indication signaling in the second uplink subframe after k subframes;

four, transmitting the data according to the uplink resource indication signaling in the second and the third uplink subframes after k subframes;

for the uplink subframe indication signaling in a DwPTS, the four values of 00, 01, 10, and 11 respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data and the channel quality indication signaling according to the uplink resource indication signaling in the second uplink subframe after k subframes;

four, transmitting the data according to the uplink resource indication signaling in the second and the third uplink subframes after k subframes;

k is a fixed value and can be any value of 1 to 6.

2. The method according to claim 1, wherein when a system only supports a single frame dispatching, the uplink subframe indication signaling is 1 bit and has two values of 0 and 1; wherein one value is used to denote that the data is transmitted according to the uplink resource indication signaling in the first uplink subframe after k subframes, and the other value is used to denote that the data is transmitted according to the uplink resource indication signaling in the second uplink subframe after k subframes; and k is a fixed value and can be any value of 1 to 6.

3. The method according to claim 1, wherein when the system supports not only a single frame dispatching but also a multi-frame dispatching, the uplink subframe indication signaling is 2 bits and has four values of 00, 01, 10 and 11; and the four values respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data according to the uplink resource indication signaling in the first and the second uplink subframes after k subframes;

four, transmitting the data according to the uplink resource indication signaling in the first, the second and the third uplink subframes after k subframes; and k is a fixed value and can be any value of 1 to 6.

4. The method according to claim 1, wherein when the system supports not only a single frame dispatching but also a multi-frame dispatching, the uplink subframe indication signaling is 2 bits and has four values of 00, 01, 10 and 11; and the four values respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data according to the uplink resource indication signaling in the first and the second uplink subframes after k subframes;

four, transmitting the data according to the uplink resource indication signaling in the second and the third uplink subframes after k subframes; and k is a fixed value and can be any value of 1 to 6.

5. The method according to claim 1, wherein when the system supports not only a single frame dispatching but also a multi-frame dispatching, the uplink subframe indication signaling is 2 bits and has four values of 00, 01, 10 and 11; and the four values respectively uniquely represent one of the following four different meanings:

one, transmitting the data according to the uplink resource indication signaling in the first uplink subframe after k subframes;

two, transmitting the data and a channel quality indication signaling according to the uplink resource indication signaling in the first uplink subframe after k subframes;

three, transmitting the data according to the uplink resource indication signaling in the second uplink subframe after k subframes;

four, transmitting the data according to the uplink resource indication signaling in the second and the third uplink subframes after k subframes; and k is a fixed value and can be any value of 1 to 6.

6. The method according to claim 1, wherein when the system supports not only single frame dispatching but also multi-frame dispatching, the uplink subframe indication signaling is 2 bits and has four values of 00, 01, 10 and 11; when a switching period is 5 ms and the proportion of the uplink subframes and the downlink subframes is 3:1, for the uplink subframe indication signaling in subframe #0 and subframe #5, the four values respectively uniquely represent one of the following four different meanings:

one, transmitting the data according to the uplink resource indication signaling in the first uplink subframe after k subframes;

two, transmitting the data according to the uplink resource indication signaling in the first uplink subframe after k subframes, and transmitting a channel quality indication signaling;

three, transmitting the data and a channel quality indication signaling according to the uplink resource indication signaling in the second uplink subframe after k subframes;

four, transmitting the data according to the uplink resource indication signaling in the first and the second uplink subframes after k subframes; and for the uplink subframe indication signaling in a DwPTS, the four values of 00, 01, 10, and 11 respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data and a channel quality indication signaling according to the uplink resource indication signaling in the second uplink subframe after k subframes;

four, transmitting the data according to the uplink resource indication signaling in the first and the second uplink subframes after k subframes; and k is a fixed value and can be any value of 1 to 6.

7. The method according to claim 1, wherein when the system supports not only a single frame dispatching but also a multi-frame dispatching, the uplink subframe indication signaling is 2 bits and has four values of 00, 01, 10 and 11; when a switching period is 5 ms and the proportion of the uplink subframes and the downlink subframes is 3:1, for the uplink subframe indication signaling in subframe #0 and subframe #5, the four values respectively uniquely represent one of the following four different meanings:

one, transmitting the data according to the uplink resource indication signaling in the first uplink subframe after k subframes;

two, transmitting the data and a channel quality indication signaling according to the uplink resource indication signaling in the first uplink subframe after k subframes;

three, transmitting the data according to the uplink resource indication signaling in the second uplink subframe after k subframes;

four, transmitting the data according to the uplink resource indication signaling in the second and the third uplink subframes after k subframes; and for the uplink subframe indication signaling in a DwPTS, the four values of 00, 01, 10, and 11 respectively uniquely represent one of the following four different meanings:

one, transmitting the data and a channel quality indication signaling according to the uplink resource indication signaling in the second uplink subframe after k subframes;

two, transmitting the data and the channel quality indication signaling according to the uplink resource indication signaling in the first uplink subframe after k subframes;

three, transmitting the data according to the uplink resource indication signaling in the second uplink subframe after k subframes;

four, transmitting the data according to the uplink resource indication signaling in the second and the third uplink subframes after k subframes; and k is a fixed value and can be any value of 1 to 6.

8. The method according to claim 1, wherein when the system supports not only a single frame dispatching but also a multi-frame dispatching, the uplink subframe indication signaling is 2 bits and has four values of 00, 01, 10 and 11; when a switching period is 5 ms and the proportion of the uplink subframe and the downlink subframes is 3:1, for the uplink subframe indication signaling in subframe #0 and subframe #5, the four values respectively uniquely represent one of the following four different meanings:

one, transmitting the data according to the uplink resource indication signaling in the first uplink subframe after k subframes;

two, transmitting the data and a channel quality indication signaling according to the uplink resource indication signaling in the first uplink subframe after k subframes;

three, transmitting the data and the channel quality indication signaling according to the uplink resource indication signaling in the second uplink subframe after k subframes;

four, transmitting the data according to the uplink resource indication signaling in the second and the third uplink subframes after k subframes; and for the uplink subframe indication signaling in a DwPTS, the four values of 00, 01, 10, and 11 respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data and the channel quality indication signaling according to the uplink resource indication signaling in the second uplink subframe after k subframes;

four, transmitting the data according to the uplink resource indication signaling in the second and the third uplink subframes after k subframes; and k is a fixed value and can be any value of 1 to 6.

9. The method according to claim 1, wherein the value of k is 2 or 3.

10. The method according to claim 1, wherein after receiving the uplink resource indication signaling, the user side transmits the data at a corresponding location according to the indication of the uplink resource indication signaling in the uplink subframe indicated by the uplink subframe indication signaling corresponding to the uplink resource indication signaling.

11. A system for indicating an uplink resource, comprising a base station and a terminal, wherein the base station includes an uplink resource indication signaling generating unit, an uplink subframe indication signaling generating unit and a transmitting unit, wherein the uplink resource indication signaling generating unit is adapted to generate an uplink resource indication signaling and transmit it to the transmitting unit;

the uplink subframe indication signaling generating unit is adapted to acquire the uplink resource indication signaling from the uplink resource indication signaling generating unit, generate an uplink subframe indication signaling corresponding to the acquired uplink resource indication signaling, and transmit it to the transmitting unit; the uplink subframe indication signaling is used to indicate the terminal to transmit data in a corresponding uplink subframe according to the uplink resource indication signaling; and the transmitting unit is adapted to transmit the uplink resource indication signaling and the uplink subframe indication signaling corresponding thereto in a downlink subframe; wherein, when the system only supports a single frame dispatching, the uplink subframe indication signaling generating unit generates an uplink subframe indication signaling of 1 bit which has two values of 0 and 1; wherein one value is used to denote that the data is transmitted according to the uplink resource indication signaling in the first uplink subframe after k subframes, and the other value is used to denote that the data is transmitted according to the uplink resource indication signaling in the second uplink subframe after k subframes; and k is a fixed value and can be any value of 1 to 6; or when the system supports not only a single frame dispatching but also a multi-frame dispatching, the uplink subframe indication signaling generating unit generates an uplink subframe indication signaling of 2 bits which has four values of 00, 01, 10 and 11; and the four values respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data according to the uplink resource indication signaling in the first and the second uplink subframes after k subframes;

four, transmitting the data according to the uplink resource indication signaling in the first, the second and the third uplink subframes after k subframes; and k is a fixed value and can be any value of 1 to 6; or when the system supports not only a single frame dispatching but also a multi-frame dispatching, the uplink subframe indication signaling generating unit generates an uplink subframe indication signaling of 2 bits which has four values of 00, 01, 10 and 11; and the four values respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data according to the uplink resource indication signaling in the first and the second uplink subframes after k subframes;

four, transmitting the data according to the uplink resource indication signaling in the second and the third uplink subframes after k subframes; and k is a fixed value and can be any value of 1 to 6; or when the system supports not only a single frame dispatching but also a multi-frame dispatching, the uplink subframe indication signaling generating unit generates an uplink subframe indication signaling of 2 bits which has four values of 00, 01, 10 and 11; and the four values respectively uniquely represent one of the following four different meanings:

one, transmitting the data according to the uplink resource indication signaling in the first uplink subframe after k subframes;

two, transmitting the data and a channel quality indication signaling according to the uplink resource indication signaling in the first uplink subframe after k subframes;

three, transmitting the data according to the uplink resource indication signaling in the second uplink subframe after k subframes;

four, transmitting the data according to the uplink resource indication signaling in the second and the third uplink subframes after k subframes; and k is a fixed value and can be any value of 1 to 6; or when the system supports not only a single frame dispatching but also a multi-frame dispatching, the uplink subframe indication signaling generating unit generates an uplink subframe indication signaling of 2 bits which has four values of 00, 01, 10 and 11; when a switching period is 5 ms and the proportion of the uplink subframes and the downlink subframes is 3:1, for the uplink subframe indication signaling in subframe #0 and subframe #5, the four values respectively uniquely represent one of the following four different meanings:

one, transmitting the data according to the uplink resource indication signaling in the first uplink subframe after k subframes;

two, transmitting the data according to the uplink resource indication signaling in the first uplink subframe after k subframes, and transmitting a channel quality indication signaling;

three, transmitting the data and the channel quality indication signaling according to the uplink resource indication signaling in the second uplink subframe after k subframes;

four, transmitting the data according to the uplink resource indication signaling in the first and the second uplink subframes after k subframes; and for the uplink subframe indication signaling in a Downlink Pilot Time Slot (DwPTS), the four values of 00, 01, 10, and 11 respectively uniquely represent one of the following four different meanings:

one, transmitting the data according to the uplink resource indication signaling in the first uplink subframe after k subframes;

two, transmitting the data according to the uplink resource indication signaling in the second uplink subframe after k subframes;

three, transmitting the data and the channel quality indication signaling according to the uplink resource indication signaling in the second uplink subframe after k subframes;

four, transmitting the data according to the uplink resource indication signaling in the first and the second uplink subframes after k subframes; and k is a fixed value and can be any value of 1 to 6; or when the system supports not only a single frame dispatching but also a multi-frame dispatching, the uplink subframe indication signaling generating unit generates an uplink subframe indication signaling of 2 bits which has four values of 00, 01, 10 and 11; when a switching period is 5 ms and the proportion of the uplink subframes and the downlink subframes is 3:1, for the uplink subframe indication signaling in subframe #0 and subframe #5, the four values respectively uniquely represent one of the following four different meanings:
one, transmitting the data according to the uplink resource indication signaling in the first uplink subframe after k subframes;
two, transmitting the data and a channel quality indication signaling according to the uplink resource indication signaling in the first uplink subframe after k subframes;
three, transmitting the data according to the uplink resource indication signaling in the second uplink subframe after k subframes;
four, transmitting the data according to the uplink resource indication signaling in the second and the third uplink subframes after k subframes; and
for the uplink subframe indication signaling in a DwPTS, the four values of 00, 01, 10, and 11 respectively uniquely represent one of the following four different meanings:
one, transmitting the data and the channel quality indication signaling according to the uplink resource indication signaling in the second uplink subframe after k subframes;
two, transmitting the data and the channel quality indication signaling according to the uplink resource indication signaling in the first uplink subframe after k subframes;
three, transmitting the data according to the uplink resource indication signaling in the second uplink subframe after k subframes;
four, transmitting the data according to the uplink resource indication signaling in the second and the third uplink subframes after k subframes; and
k is a fixed value and can be any value of 1 to 6; or
when the system supports not only a single frame dispatching but also a multi-frame dispatching, the uplink subframe indication signaling generating unit generates an uplink subframe indication signaling of 2 bits which has four values of 00, 01, 10 and 11; when a switching period is 5 ms and the proportion of the uplink subframes and the downlink subframes is 3:1, for the uplink subframe indication signaling in subframe #0 and subframe #5, the four values respectively uniquely represent one of the following four different meanings:
one, transmitting the data according to the uplink resource indication signaling in the first uplink subframe after k subframes;
two, transmitting the data and a channel quality indication signaling according to the uplink resource indication signaling in the first uplink subframe after k subframes;
three, transmitting the data and the channel quality indication signaling according to the uplink resource indication signaling in the second uplink subframe after k subframes;
four, transmitting the data according to the uplink resource indication signaling in the second and the third uplink subframes after k subframes; and
for the uplink subframe indication signaling in a DwPTS, the four values of 00, 01, 10, and 11 respectively uniquely represent one of the following four different meanings:
one, transmitting the data according to the uplink resource indication signaling in the first uplink subframe after k subframes;
two, transmitting the data according to the uplink resource indication signaling in the second uplink subframe after k subframes;
three, transmitting the data and the channel quality indication signaling according to the uplink resource indication signaling in the second uplink subframe after k subframes;
four, transmitting the data according to the uplink resource indication signaling in the second and the third uplink subframes after k subframes; and
k is a fixed value and can be any value of 1 to 6.

12. The system according to claim 11, wherein
when the system only supports a single frame dispatching, the uplink subframe indication signaling generating unit generates an uplink subframe indication signaling of 1 bit which has two values of 0 and 1; wherein one value is used to denote that the data is transmitted according to the uplink resource indication signaling in the first uplink subframe after k subframes, and the other value is used to denote that the data is transmitted according to the uplink resource indication signaling in the second uplink subframe after k subframes; and k is a fixed value and can be any value of 1 to 6.

13. The system according to claim 11, wherein
when the system supports not only a single frame dispatching but also a multi-frame dispatching, the uplink subframe indication signaling generating unit generates an uplink subframe indication signaling of 2 bits which has four values of 00, 01, 10 and 11; and the four values respectively uniquely represent one of the following four different meanings:
one, transmitting the data according to the uplink resource indication signaling in the first uplink subframe after k subframes;
two, transmitting the data according to the uplink resource indication signaling in the second uplink subframe after k subframes;
three, transmitting the data according to the uplink resource indication signaling in the first and the second uplink subframes after k subframes;
four, transmitting the data according to the uplink resource indication signaling in the first, the second and the third uplink subframes after k subframes; and
k is a fixed value and can be any value of 1 to 6.

14. The system according to claim 11, wherein
when the system supports not only a single frame dispatching but also a multi-frame dispatching, the uplink subframe indication signaling generating unit generates an uplink subframe indication signaling of 2 bits which has four values of 00, 01, 10 and 11; and the four values respectively uniquely represent one of the following four different meanings:
one, transmitting the data according to the uplink resource indication signaling in the first uplink subframe after k subframes;
two, transmitting the data according to the uplink resource indication signaling in the second uplink subframe after k subframes;
three, transmitting the data according to the uplink resource indication signaling in the first and the second uplink subframes after k subframes;
four, transmitting the data according to the uplink resource indication signaling in the second and the third uplink subframes after k subframes; and
k is a fixed value and can be any value of 1 to 6.

15. The system according to claim 11, wherein
when the system supports not only a single frame dispatching but also a multi-frame dispatching, the uplink subframe indication signaling generating unit generates an uplink subframe indication signaling of 2 bits which has four values of 00, 01, 10 and 11; and the four values respectively uniquely represent one of the following four different meanings:
one, transmitting the data according to the uplink resource indication signaling in the first uplink subframe after k subframes;
two, transmitting the data and a channel quality indication signaling according to the uplink resource indication signaling in the first uplink subframe after k subframes;
three, transmitting the data according to the uplink resource indication signaling in the second uplink subframe after k subframes;
four, transmitting the data according to the uplink resource indication signaling in the second and the third uplink subframes after k subframes; and
k is a fixed value and can be any value of 1 to 6.

16. The system according to claim 11, wherein
when the system supports not only a single frame dispatching but also a multi-frame dispatching, the uplink subframe indication signaling generating unit generates an uplink subframe indication signaling of 2 bits which has four values of 00, 01, 10 and 11; when a switching period is 5 ms and the proportion of the uplink subframes and the downlink subframes is 3:1, for the uplink subframe indication signaling in subframe #0 and subframe #5, the four values respectively uniquely represent one of the following four different meanings:
one, transmitting the data according to the uplink resource indication signaling in the first uplink subframe after k subframes;
two, transmitting the data according to the uplink resource indication signaling in the first uplink subframe after k subframes, and transmitting a channel quality indication signaling;
three, transmitting the data and the channel quality indication signaling according to the uplink resource indication signaling in the second uplink subframe after k subframes;
four, transmitting the data according to the uplink resource indication signaling in the first and the second uplink subframes after k subframes; and
for the uplink subframe indication signaling in a DwPTS, the four values of 00, 01, 10, and 11 respectively uniquely represent one of the following four different meanings:
one, transmitting the data according to the uplink resource indication signaling in the first uplink subframe after k subframes;
two, transmitting the data according to the uplink resource indication signaling in the second uplink subframe after k subframes;
three, transmitting the data and the channel quality indication signaling according to the uplink resource indication signaling in the second uplink subframe after k subframes;
four, transmitting the data according to the uplink resource indication signaling in the first and the second uplink subframes after k subframes; and
k is a fixed value and can be any value of 1 to 6.

17. The system according to claim 11, wherein
when the system supports not only a single frame dispatching but also a multi-frame dispatching, the uplink subframe indication signaling generating unit generates an uplink subframe indication signaling of 2 bits which has four values of 00, 01, 10 and 11; when a switching period is 5 ms and the proportion of the uplink subframes and the downlink subframes is 3:1, for the uplink subframe indication signaling in subframe #0 and subframe #5, the four values respectively uniquely represent one of the following four different meanings:
one, transmitting the data according to the uplink resource indication signaling in the first uplink subframe after k subframes;
two, transmitting the data and a channel quality indication signaling according to the uplink resource indication signaling in the first uplink subframe after k subframes;
three, transmitting the data according to the uplink resource indication signaling in the second uplink subframe after k subframes;
four, transmitting the data according to the uplink resource indication signaling in the second and the third uplink subframes after k subframes; and
for the uplink subframe indication signaling in a DwPTS, the four values of 00, 01, 10, and 11 respectively uniquely represent one of the following four different meanings:
one, transmitting the data and the channel quality indication signaling according to the uplink resource indication signaling in the second uplink subframe after k subframes;
two, transmitting the data and the channel quality indication signaling according to the uplink resource indication signaling in the first uplink subframe after k subframes;
three, transmitting the data according to the uplink resource indication signaling in the second uplink subframe after k subframes;
four, transmitting the data according to the uplink resource indication signaling in the second and the third uplink subframes after k subframes; and
k is a fixed value and can be any value of 1 to 6.

18. The system according to claim 11, wherein
when the system supports not only a single frame dispatching but also a multi-frame dispatching, the uplink subframe indication signaling generating unit generates an uplink subframe indication signaling of 2 bits which has four values of 00, 01, 10 and 11; when a switching period is 5 ms and the proportion of the uplink subframes and the downlink subframes is 3:1, for the uplink subframe indication signaling in subframe #0 and subframe #5, the four values respectively uniquely represent one of the following four different meanings:
one, transmitting the data according to the uplink resource indication signaling in the first uplink subframe after k subframes;
two, transmitting the data and a channel quality indication signaling according to the uplink resource indication signaling in the first uplink subframe after k subframes;
three, transmitting the data and the channel quality indication signaling according to the uplink resource indication signaling in the second uplink subframe after k subframes;
four, transmitting the data according to the uplink resource indication signaling in the second and the third uplink subframes after k subframes; and
for the uplink subframe indication signaling in a DwPTS, the four values of 00, 01, 10, and 11 respectively uniquely represent one of the following four different meanings:
one, transmitting the data according to the uplink resource indication signaling in the first uplink subframe after k subframes;

two, transmitting the data according to the uplink resource indication signaling in the second uplink subframe after k subframes;

three, transmitting the data and the channel quality indication signaling according to the uplink resource indication signaling in the second uplink subframe after k subframes;

four, transmitting the data according to the uplink resource indication signaling in the second and the third uplink subframes after k subframes; and k is a fixed value and can be any value of 1 to 6.

19. The system according to claim 11, wherein the value of k is 2 or 3.

20. The system according to claim 11, wherein after receiving the uplink resource indication signaling and the uplink subframe indication signaling corresponding thereto, the terminal transmits the data at a corresponding location according to the indication of the uplink resource indication signaling in the uplink subframe indicated by the uplink subframe indication signaling.

* * * * *